United States Patent
Qian

(10) Patent No.: US 9,002,323 B2
(45) Date of Patent: Apr. 7, 2015

(54) SIM CARD AUTHENTICATION SYSTEM AND METHOD

(71) Applicants: Fu Tai Hua Industry (Shenzhen) Co., Ltd., Shenzhen (CN); Hon Hai Precision Industry Co., Ltd., New Taipei (TW)

(72) Inventor: Xian Qian, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 5 days.

(21) Appl. No.: 13/940,273

(22) Filed: Jul. 12, 2013

(65) Prior Publication Data
US 2014/0148127 A1  May 29, 2014

(30) Foreign Application Priority Data
Nov. 27, 2012 (CN) .......................... 2012 1 04909122

(51) Int. Cl.
H04W 88/02 (2009.01)
H04W 12/06 (2009.01)
H04W 12/12 (2009.01)

(52) U.S. Cl.
CPC .............. *H04W 12/06* (2013.01); *H04W 12/12* (2013.01); *H04W 88/02* (2013.01)

(58) Field of Classification Search
USPC ........................................................ 455/411
See application file for complete search history.

(56) References Cited

U.S. PATENT DOCUMENTS

| 2007/0105531 A1* | 5/2007 | Schroeder, Jr. ................ 455/411 |
| 2009/0082061 A1* | 3/2009 | Roh et al. .................... 455/556.1 |
| 2013/0283040 A1* | 10/2013 | Tu .................................. 713/155 |

* cited by examiner

*Primary Examiner* — Diane Mizrahi
(74) *Attorney, Agent, or Firm* — Novak Druce Connolly Bove + Quigg LLP

(57) ABSTRACT

A SIM card authentication system and a SIM card authentication method adapted for a mobile phone are disclosed. Once the mobile phone is lost, when a SIM card is inserted into the mobile phone, the SIM card authentication system controls the mobile phone to display the user interface, the user must input the right authentication phone number to use the mobile phone. If the user inputs a wrong authentication phone number, the user is illegal and cannot use the mobile phone, the system acquires the phone number of the inserted SIM card to notify a legal user. Therefore, the mobile phone protects and hides stored information from the user, and the legal user may get back the mobile phone according to information from the inserted SIM card.

10 Claims, 4 Drawing Sheets

SIM CARD AUTHENTICATION SYSTEM AND METHOD

BACKGROUND

1. Technical Field

The disclosure relates to an authentication technology and, more particularly, to a Subscriber Identification Module (SIM) card authentication system and a SIM card authentication method adapted for a mobile phone.

2. Description of Related Art

With trends towards miniaturization of mobile phones becoming popular, smaller mobile phones are easy to be lost or stolen. Therefore, information stored in the mobile phone about the owner of the mobile phone may be illegally accessed, which may result in loss or privacy intrusion for the owner.

Therefore, what is needed is a SIM card authentication system to overcome the described shortcoming.

DETAILED DESCRIPTION

Figure 1:
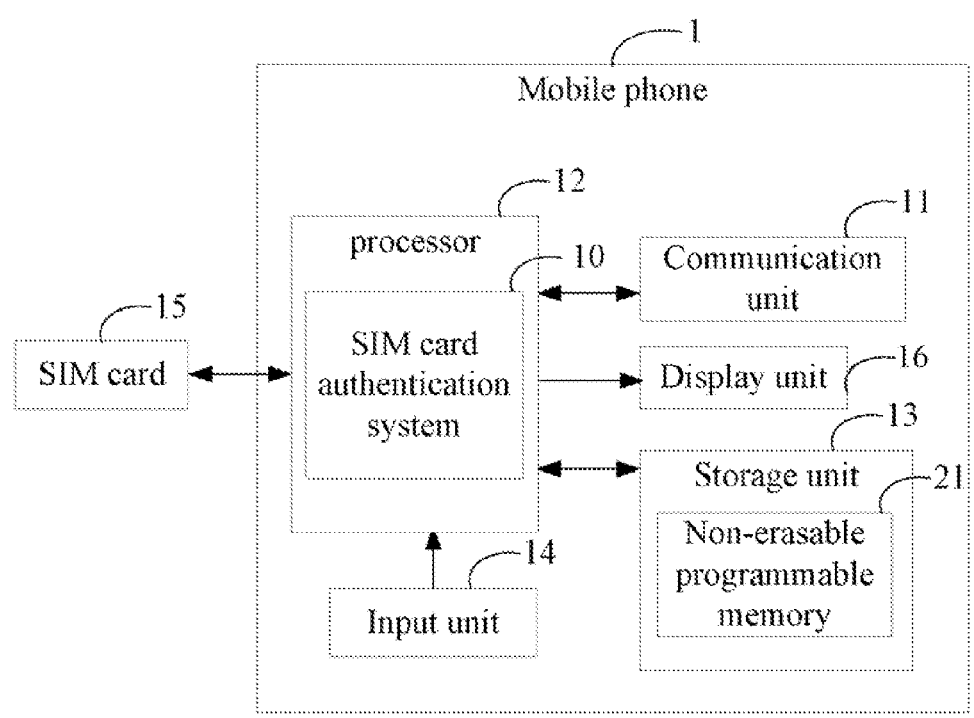
FIG. 1 is a block diagram of a mobile phone including a SIM card authentication system in accordance with an exemplary embodiment.

FIG. 1 is a block diagram of a mobile phone including a SIM card authentication system in accordance with an exemplary embodiment. The mobile phone 1 includes a communication unit 11, a processor 12, a storage unit 13, an input unit 14, and a display unit 16. When a SIM card 15 is inserted into the mobile phone 1, the mobile phone 1 recognizes the SIM card 15 and may establish a communication link via the communication unit 11. The communication unit 11 receives wireless signals from a wireless communication system (not shown) and sends wireless signals to the wireless communication system.

The input unit 14 generates input signals in response to user input. The storage unit 13 includes a non-erasable programmable memory 21 and an erasable programmable memory (not shown). The non-erasable programmable memory 21 stores non-erasable information, such as an International Mobile Equipment Identity (IMEI) number of the mobile phone 1 and an authentication phone number. The erasable programmable memory stores erasable information, such as position information of the mobile phone 1.

When the mobile phone 1 is restored to factory settings or the system of the mobile phone 1 is updated, information stored in the erasable programmable memory will be resumed to the default factory settings, whereas the information of the non-erasable programmable memory 21 cannot be deleted and is permanently stored in the mobile phone 1. The display unit 16 displays information. The processor 12 controls the mobile phone 1 to work and performs the SIM card authentication system 10.

Figure 2:
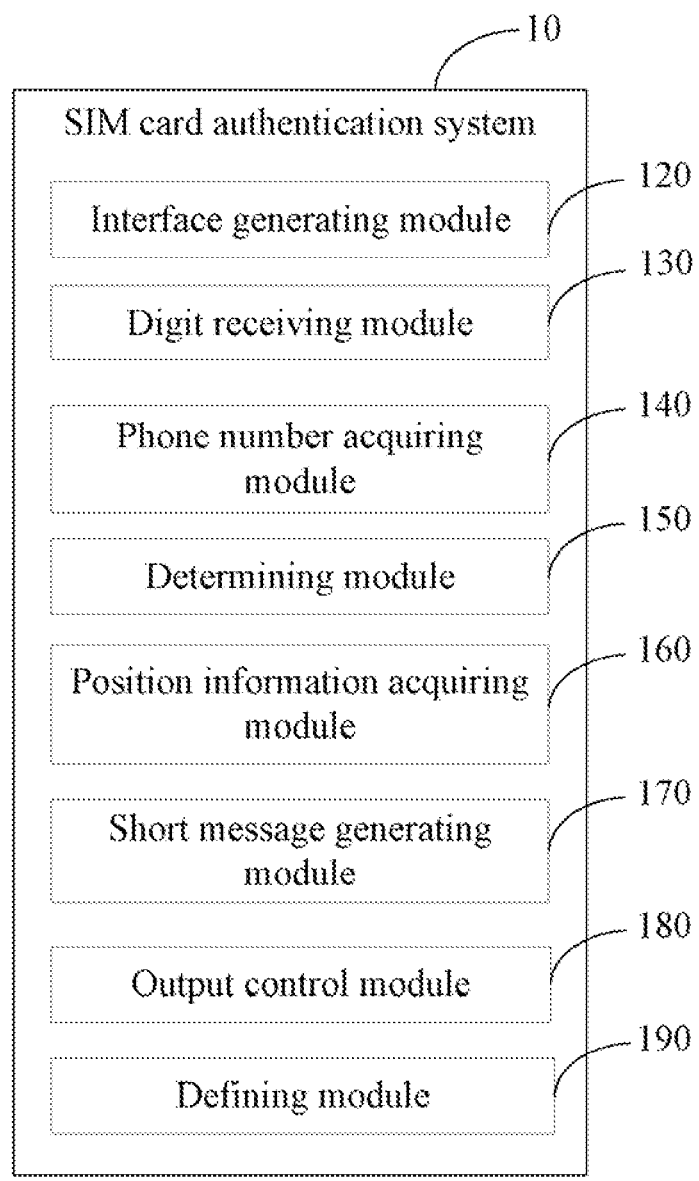
FIG. 2 is a block diagram of the SIM card authentication system of the mobile phone of FIG. 1.

As shown in FIG. 2, the SIM card authentication system 10 further includes an interface generating module 120, a digit receiving module 130, a phone number acquiring module 140, a determining module 150, a position information generating module 160, a short message generating module 170, an output control module 180, and a defining module 190, all of which are executed by the processor 12.

When the SIM card 15 is inserted into the mobile phone 1 and the mobile phone 1 is powered on, for example, a user of the mobile phone 1 changes a SIM card, the interface generating module 120 controls the display unit 16 to display a user interface for authenticating the user of the mobile phone 1. The digit receiving module 130 receives a series of digits in the user interface in response to user input from the input unit 14, for example, the user inputs "13636359789" digits in the user interface.

The determining module 150 determines whether the series of digits is the same as the authentication phone number in the storage unit 13. When the series of digits is different from the authentication phone number, the output control module 180 turns off the mobile phone 1. Therefore, when a user does not know the authentication phone number in the mobile phone 1, the user can not use the mobile phone 1.

When the series of digits is the same as the authentication phone number, the phone number acquiring module 140 acquires a phone number of the inserted SIM card 15. The determining module 150 determines whether the phone number of the inserted SIM card 15 is the same as the authentication phone number in the storage unit 13. When the phone number of the inserted SIM card 15 is the same as the authentication phone number in the storage unit 13, the output control module 180 controls the mobile phone 1 to enter a work mode, therefore, the user may operate the mobile phone 1 and obtain information stored in the mobile phone 1.

When the phone number of the inserted SIM card 15 is different from the authentication phone number in the storage unit 13, the output control module 180 controls the display unit 16 to display a defining interface for updating the authentication phone number in the storage unit 13. The defining module 190 updates the authentication phone number in the defining interface in response to user input. The determining module 150 determines whether the updated authentication phone number is the same as the phone number of the inserted SIM card 15. When the updated authentication phone number is the same as the phone number of the inserted SIM card 15, the output control module 180 stores the updated authentication phone number in the non-erasable programmable memory 21 and controls the mobile phone 1 to enter the work mode. When the updated authentication phone number is different from the phone number of the inserted SIM card 15, the output control module 180 turns off the mobile phone 1.

Furthermore, the storage unit 13 stores an alert phone number. When the series of digits is different from the authentication phone number, it means that an illegal user wants to use the mobile phone 1, the phone number acquiring module 140 acquires a phone number of the inserted SIM card 15 and the short message generating module 170 generates a short message containing the phone number of the inserted SIM card 15 and controls the communication unit 11 to send the short message to the alert phone number. Therefore, a legal user associated with the alert phone number may know who uses the mobile phone 1 via the short message.

Furthermore, the storage unit 13 stores position information of the mobile phone 1. A positioning unit (not shown) generates the position information in real time. When the series of digits is different from the authentication phone number, the phone number acquiring module 140 acquires the phone number of the inserted SIM card 15 and the position information and the short message generating module 170 generates a short message containing the phone number of the inserted SIM card 15 and the position information and controls the communication unit 11 to send the short message to the alert phone number. Therefore, a legal user associated with the alert phone number may know who uses the mobile phone 1 and the position where the mobile phone 1 is via the short message.

Once the mobile phone 1 is lost, when a SIM card 14 is inserted into the mobile phone 1, the SIM card authentication system 10 controls the mobile phone 1 to display the user interface, the user must input the right authentication phone number to use the mobile phone 1. If the user inputs a wrong authentication phone number, the user is illegal and cannot use the mobile phone, the system 10 acquires the phone number of the inserted SIM card to notify a legal user. Therefore, the mobile phone 1 protects and hides stored information from the user, and the legal user may get back the mobile phone 1 according to information from the inserted SIM card.

Figure 3:
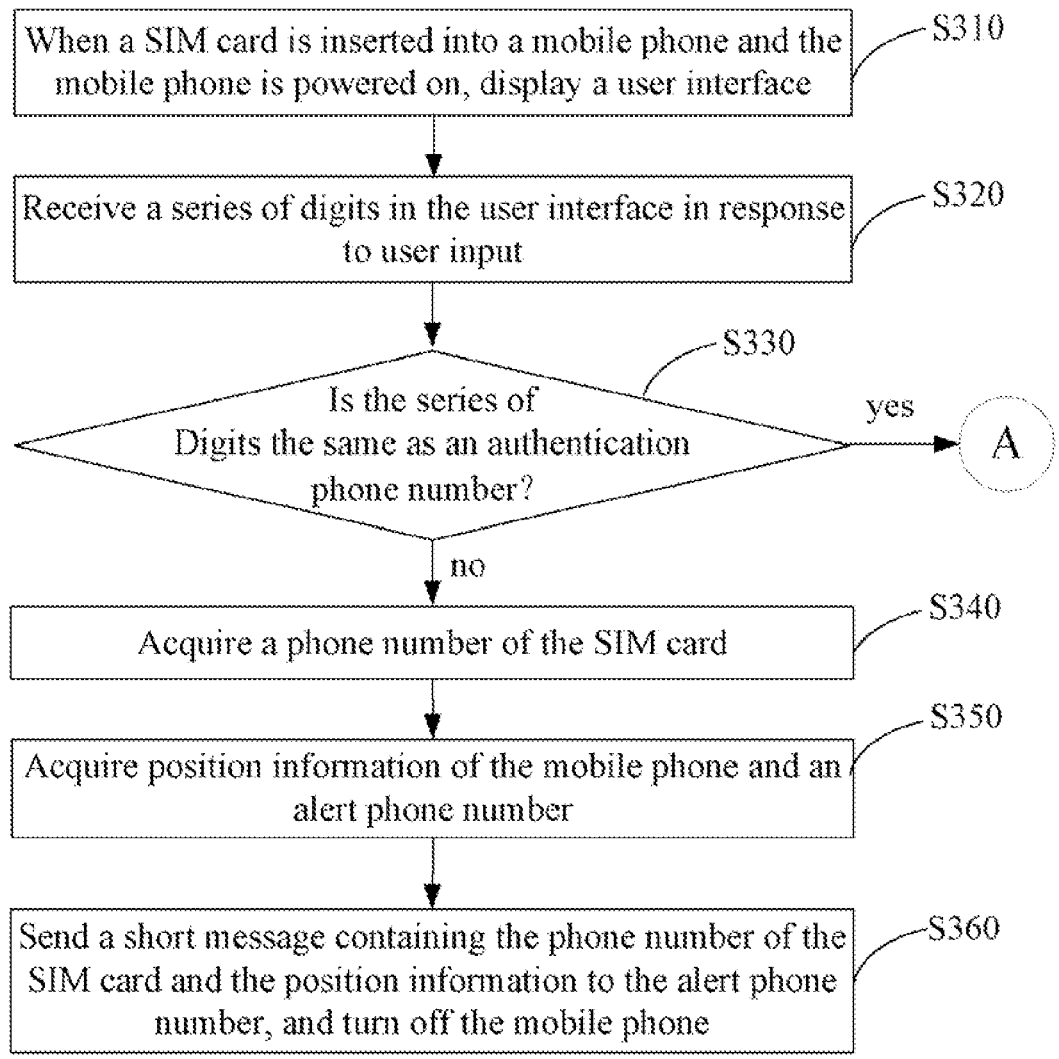
FIGS. 3 and 4 are a flowchart of authenticating SIM card method adapted for the mobile phone of FIG. 1.
Figure 4:
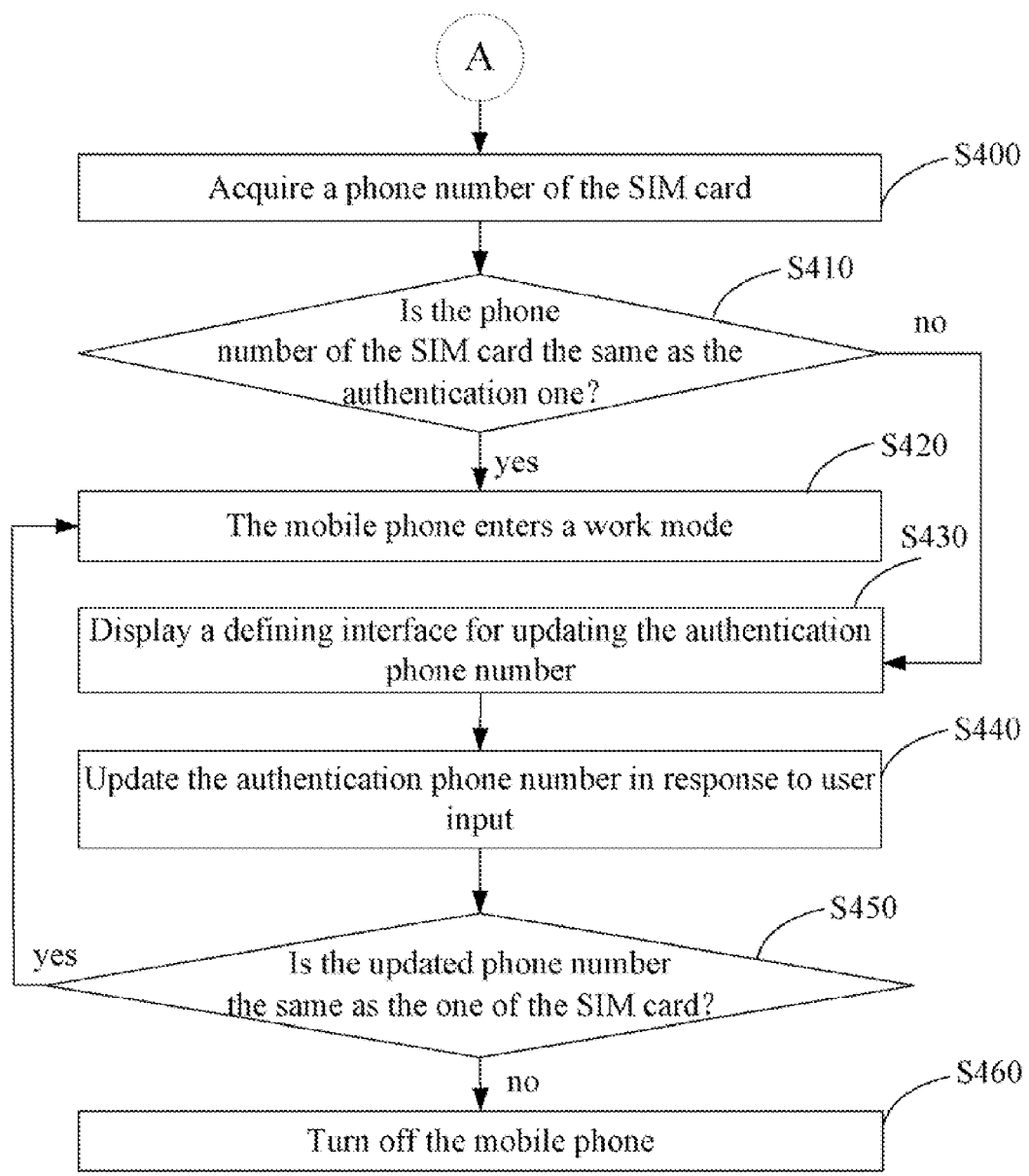

FIGS. 3 and 4 are a flowchart of authenticating SIM card method adapted for the mobile phone of FIG. 1. In step S310, when the SIM card 15 is inserted into the mobile phone 1 and the mobile phone 1 is powered on, the interface generating module 120 controls the display unit 16 to display a user interface for authenticating the user of the mobile phone 1. In step S320, the digit receiving module 130 receives a series of digits in the user interface in response to user input from the input unit 14.

In step S330, the determining module 150 determines whether the series of digits is the same as the authentication phone number in the storage unit 13. In step S340, when the series of digits is different from the authentication phone number, the phone number acquiring module 140 acquires the phone number of the inserted SIM card 15. In step S350, the phone number acquiring module 140 further acquires the position information of the mobile phone 1 and the alert phone number in the storage unit 13.

In step S360, the short message generating module 170 generates a short message containing the phone number of the inserted SIM card 15 and the position information and controls the communication unit 11 to send the short message to the alert phone number, and the output control module 180 turns off the mobile phone 1.

In step S400, when the series of digits is the same as the authentication phone number, the phone number acquiring module 140 acquires a phone number of the inserted SIM card 15. In step S410, the determining module 150 determines whether the phone number of the inserted SIM card 15 is the same as the authentication phone number in the storage unit 13. In step S420, when the phone number of the inserted SIM card 15 is the same as the authentication phone number in the storage unit 13, the output control module 180 controls the mobile phone 1 to enter a work mode.

In step S430, when the phone number of the inserted SIM card 15 is different from the authentication phone number in the storage unit 13, the output control module 180 controls the display unit 16 to display a defining interface for updating the authentication phone number in the storage unit 13. In step S440, the defining module 190 updates the authentication phone number in the defining interface in response to user input.

In step S450, the determining module 150 determines whether the updated authentication phone number is the same as the phone number of the inserted SIM card 15. When the updated authentication phone number is the same as the phone number of the inserted SIM card 15, the output control module 180 stores the updated authentication phone number in the non-erasable programmable memory 21 and controls the mobile phone 1 to enter the work mode, the procedure returns step S420. In step S460, when the updated authentication phone number is different from the phone number of the inserted SIM card 15, the output control module 180 turns off the mobile phone 1.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A Subscriber Identification Module (SIM) card authentication system for a mobile phone, wherein the mobile phone comprises a display unit and stores an authentication phone number, the SIM card authentication system comprising:
   an interface generating module to controls the display unit to display a user interface for authenticating a user of the mobile phone when a SIM card is inserted into the mobile phone and the mobile phone is powered on;
   a digit receiving module to receive a series of digits in the user interface in response to user input;
   a determining module to determine whether the series of digits is the same as the authentication phone number; and
   an output control module to turn off the mobile phone when the series of digits is different from the authentication phone number;
   wherein the SIM card authentication system further comprises at least one processor to execute the modules of the SIM card authentication system.

2. The SIM card authentication system of claim 1, further comprising:
   a phone number acquiring module to acquire a phone number of the inserted SIM card when the series of digits is the same as the authentication phone number;
   the determining module to determine whether the phone number of the inserted SIM card is the same as the authentication phone number;
   the output control module to control the mobile phone to enter a work mode when the phone number of the inserted SIM card is the same as the authentication phone number, control the display unit to display a defining interface for updating the authentication phone number when the phone number of the inserted SIM card is different from the authentication phone number;
   a defining module to update the authentication phone number in the defining interface in response to user input;
   the determining module to determine whether the updated authentication phone number is the same as the phone number of the inserted SIM card; and
   the output control module to store the updated authentication phone number and control the mobile phone to enter the work mode when the updated authentication phone number is the same as the phone number of the inserted SIM card, and turn off the mobile phone when the updated authentication phone number is different from the phone number of the inserted SIM card.

3. The SIM card authentication system of claim 1, wherein the mobile phone comprises a non-erasable programmable memory to store the authentication phone number.

4. The SIM card authentication system of claim 1, wherein the mobile phone stores an alert phone number, and the system further comprising:
   a phone number acquiring module to acquire a phone number of the inserted SIM card when the series of digits is different from the authentication phone number; and a short message generating module to generate a short message containing the phone number of the inserted SIM card and send the short message to the alert phone number.

5. The SIM card authentication system of claim 1, wherein the mobile phone stores an alert phone number and position information of the mobile phone, the system further comprising:
  a phone number acquiring module to acquire the phone number of the inserted SIM card and the position information when the series of digits is different from the authentication phone number; and
  a short message generating module to generate a short message containing the phone number of the inserted SIM card and the position information and send the short message to the alert phone number.

6. A SIM card authentication method adapted for a mobile phone, wherein the mobile phone stores an authentication phone number, the method comprising:
  when a SIM card is inserted into the mobile phone and the mobile phone is powered on, displaying a user interface for authenticating a user of the mobile phone;
  receiving a series of digits in the user interface in response to user input;
  determining whether the series of digits is the same as the authentication phone number; and
  when the series of digits is different from the authentication phone number, turning off the mobile phone.

7. The SIM card authentication method of claim 6, further comprising:
  when the series of digits is the same as the authentication phone number, acquiring a phone number of the inserted SIM card;
  determining whether the phone number of the inserted SIM card is the same as the authentication phone number;
  when the phone number of the inserted SIM card is the same as the authentication phone number, controlling the mobile phone to enter a work mode;
  when the phone number of the inserted SIM card is different from the authentication phone number, displaying a defining interface for updating the authentication phone number;
  updating the authentication phone number in the defining interface in response to user input;
  determining whether the updated authentication phone number is the same as the phone number of the inserted SIM card; and
  when the updated authentication phone number is the same as the phone number of the inserted SIM card, storing the updated authentication phone number and controlling the mobile phone to enter the work mode; and
  when the updated authentication phone number is different from the phone number of the inserted SIM card, turning off the mobile phone.

8. The SIM card authentication method of claim 6, wherein the mobile phone comprises a non-erasable programmable memory to store the authentication phone number.

9. The SIM card authentication method of claim 6, wherein the mobile phone stores an alert phone number, the method further comprising:
  when the series of digits is different from the authentication phone number, acquiring a phone number of the inserted SIM card; and
  generating a short message containing the phone number of the inserted SIM card and sending the short message to the alert phone number.

10. The SIM card authentication method of claim 6, wherein the mobile phone stores an alert phone number and position information of the mobile phone, the method further comprising:
  when the series of digits is different from the authentication phone number, acquiring the phone number of the inserted SIM card and the position information; and
  generating a short message containing the phone number of the inserted SIM card and the position information and sending the short message to the alert phone number.

* * * * *